United States Patent
Rao et al.

(10) Patent No.: US 10,477,012 B2
(45) Date of Patent: *Nov. 12, 2019

(54) FRAUD DETECTION SYSTEM AND METHOD

(71) Applicant: Vail Systems, Inc., Deerfield, IL (US)

(72) Inventors: Srinivasa Rao, Schaumburg, IL (US); Todd Whiteley, Lake Forest, IL (US)

(73) Assignee: Vail Systems, Inc., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,977

(22) Filed: Aug. 27, 2018

(65) Prior Publication Data

US 2019/0020757 A1     Jan. 17, 2019

Related U.S. Application Data

(63) Continuation of application No. 15/646,532, filed on Jul. 11, 2017, now Pat. No. 10,091,349.

(51) Int. Cl.
*H04M 15/00* (2006.01)
*H04M 3/00* (2006.01)
*H04M 3/22* (2006.01)
*H04M 3/51* (2006.01)

(52) U.S. Cl.
CPC ....... *H04M 3/2281* (2013.01); *H04M 3/2218* (2013.01); *H04M 3/51* (2013.01); *H04M 3/5175* (2013.01); *H04M 2203/551* (2013.01); *H04M 2203/556* (2013.01); *H04M 2203/558* (2013.01); *H04M 2203/559* (2013.01); *H04M 2203/6027* (2013.01)

(58) Field of Classification Search
USPC ............. 379/114.04, 127.02, 188, 189
See application file for complete search history.

(56) References Cited

U.S. PATENT DOCUMENTS

| | | |
|---|---|---|
| 6,208,720 B1 | 3/2001 | Curtis et al. |
| 6,256,606 B1 | 7/2001 | Thyssen et al. |
| 7,171,355 B1 | 1/2007 | Chen |
| 7,251,241 B1 | 7/2007 | Jagadeesan et al. |
| 7,496,185 B1 | 2/2009 | Primavesi et al. |
| 7,912,192 B2 | 3/2011 | Kealy et al. |
| 7,925,304 B1 | 4/2011 | Gailloux et al. |
| 8,073,691 B2 | 12/2011 | Rajakumar |
| 8,094,800 B1 | 1/2012 | Smith et al. |
| 8,238,532 B1 | 8/2012 | Cox et al. |
| 8,311,826 B2 | 11/2012 | Rajakumar |
| 8,510,215 B2 | 8/2013 | Gutierrez et al. |

(Continued)

FOREIGN PATENT DOCUMENTS

| | | |
|---|---|---|
| AU | 2011276467 | 1/2012 |
| AU | 2011276467 | 4/2015 |

(Continued)

*Primary Examiner* — Quoc D Tran
(74) *Attorney, Agent, or Firm* — Leason Ellis LLP

(57) ABSTRACT

A system and method for fraud detection for a telephony platform based on an analysis of call detail records (CDRs) that are generated by the telephony platform. The analysis is based on collecting, organizing, transforming, analyzing, and quantifying the CDR data into a plurality of data analytics and data correlations and then applying fuzzy logic to the data analytics to generate a fraud risk rating for each incoming call into the platform.

20 Claims, 11 Drawing Sheets

(56) References Cited

U.S. PATENT DOCUMENTS

| | | |
|---|---|---|
| 8,793,131 B2 | 7/2014 | Guerra et al. |
| 8,897,437 B1 | 11/2014 | Tan et al. |
| 8,903,859 B2 | 12/2014 | Zeppenfeld et al. |
| 8,924,285 B2 | 12/2014 | Rajakumar et al. |
| 8,930,261 B2 | 1/2015 | Hartig et al. |
| 9,001,985 B2 | 4/2015 | Cox et al. |
| 9,031,838 B1 | 5/2015 | Nash et al. |
| 9,037,113 B2 | 5/2015 | Balasubramaniyan et al. |
| 9,113,001 B2 | 8/2015 | Rajakumar et al. |
| 9,203,962 B2 | 12/2015 | Guerra et al. |
| 9,264,536 B1 | 2/2016 | Saitawdekar et al. |
| 9,264,539 B2 | 2/2016 | Lin |
| 9,503,571 B2 | 11/2016 | Guerra et al. |
| 9,516,497 B2 | 12/2016 | Balasubramaniyan et al. |
| 9,552,417 B2 | 1/2017 | Olligschlaeger et al. |
| 9,571,652 B1 | 2/2017 | Zeppenfeld et al. |
| 9,762,728 B1 | 9/2017 | Cox et al. |
| 9,824,692 B1 | 11/2017 | Khoury et al. |
| 9,871,913 B1 | 1/2018 | Saitawdekar et al. |
| 9,883,040 B2 | 1/2018 | Strong et al. |
| 9,930,186 B2 | 3/2018 | Bandyopadhyay et al. |
| 10,091,349 B1* | 10/2018 | Rao ............... H04M 3/2281 379/114.04 |
| 2003/0054867 A1 | 3/2003 | Dowlat et al. |
| 2003/0112941 A1 | 6/2003 | Brown et al. |
| 2005/0278550 A1* | 12/2005 | Mahone ............ H04M 15/00 713/189 |
| 2006/0248019 A1 | 11/2006 | Rajakumar |
| 2007/0025281 A1 | 2/2007 | McFarland et al. |
| 2007/0081648 A1 | 4/2007 | Abramson et al. |
| 2007/0124246 A1 | 5/2007 | Lawyer et al. |
| 2007/0201625 A1 | 8/2007 | Martin et al. |
| 2007/0280436 A1 | 12/2007 | Rajakumar |
| 2007/0282613 A1 | 12/2007 | Diethorn |
| 2008/0084975 A1 | 4/2008 | Schwartz |
| 2008/0291894 A1 | 11/2008 | Chang et al. |
| 2008/0300871 A1 | 12/2008 | Gilbert |
| 2009/0063159 A1 | 3/2009 | Crockett |
| 2009/0108854 A1 | 4/2009 | Agevik et al. |
| 2009/0119106 A1 | 5/2009 | Rajakumar et al. |
| 2009/0203365 A1 | 8/2009 | Lee et al. |
| 2009/0221276 A1 | 9/2009 | Vander Veen et al. |
| 2010/0105446 A1 | 4/2010 | Charlier et al. |
| 2010/0228656 A1 | 9/2010 | Wasserblat et al. |
| 2010/0305946 A1 | 12/2010 | Gutierrez et al. |
| 2011/0028168 A1 | 2/2011 | Champlin et al. |
| 2012/0253805 A1* | 10/2012 | Rajakumar ........... H04M 15/47 704/236 |
| 2013/0097303 A1 | 4/2013 | Gichana et al. |
| 2013/0253919 A1 | 9/2013 | Gutierrez et al. |
| 2014/0044020 A1 | 2/2014 | Mikkelsen et al. |
| 2014/0105373 A1 | 4/2014 | Shame |
| 2014/0286484 A1* | 9/2014 | Ehrlich .................. H04W 4/90 379/142.06 |
| 2015/0032624 A1 | 1/2015 | Claridge et al. |
| 2015/0073987 A1 | 3/2015 | Dutt |
| 2015/0178736 A1 | 6/2015 | Hartig et al. |
| 2015/0381801 A1 | 12/2015 | Rajakumar et al. |
| 2016/0142534 A1 | 5/2016 | Guerra et al. |
| 2017/0039637 A1* | 2/2017 | Wandelmer .......... G06Q 40/025 |
| 2017/0111515 A1 | 4/2017 | Bandyopadhyay et al. |
| 2017/0126884 A1 | 5/2017 | Balasubramaniyan et al. |
| 2017/0163817 A1 | 6/2017 | Ballai et al. |
| 2017/0372725 A1 | 12/2017 | Khoury et al. |
| 2018/0041631 A1 | 2/2018 | Douglas |
| 2018/0041638 A1 | 2/2018 | Gupta et al. |
| 2018/0041823 A1 | 2/2018 | Gaubitch et al. |
| 2018/0075849 A1 | 3/2018 | Khoury et al. |
| 2018/0082689 A1 | 3/2018 | Khoury et al. |
| 2018/0082691 A1 | 3/2018 | Khoury et al. |
| 2018/0082692 A1 | 3/2018 | Khoury et al. |

FOREIGN PATENT DOCUMENTS

| | | |
|---|---|---|
| CA | 3001839 | 4/2017 |
| WO | 2012/006171 | 1/2012 |
| WO | 2012006171 | 1/2012 |

* cited by examiner

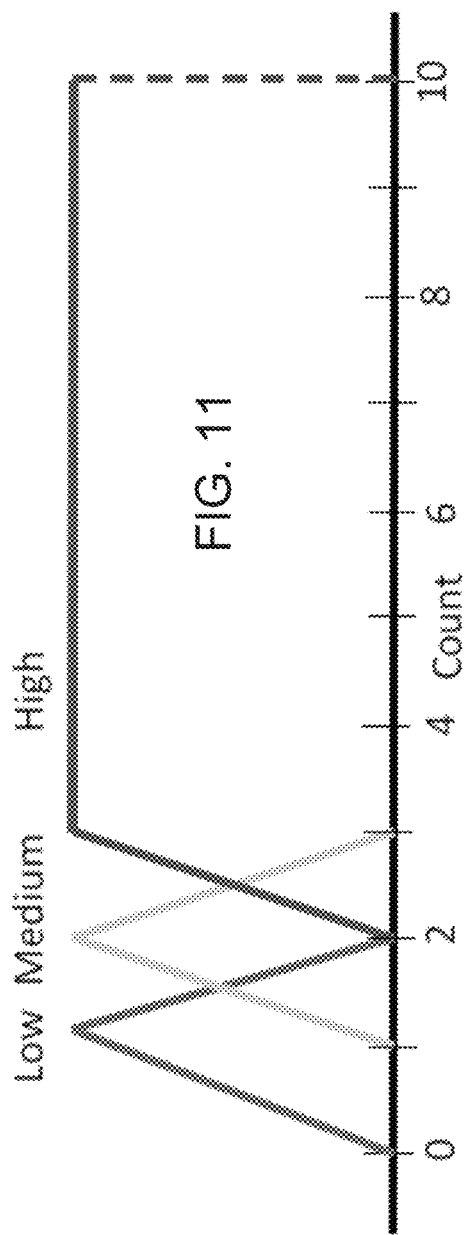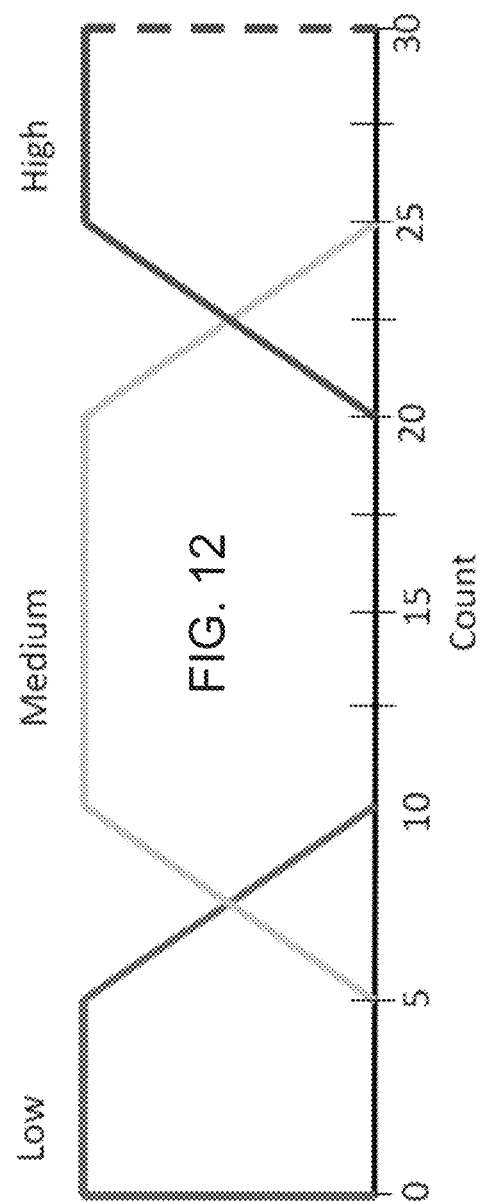

FRAUD DETECTION SYSTEM AND METHOD

RELATED APPLICATION

This application is a continuation of U.S. patent application Ser. No. 15/646,532, filed Jul. 11, 2017, issued as U.S. Pat. No. 10,091,349 on Oct. 2, 2018, which is hereby incorporated herein in its entirety.

FIELD OF THE DISCLOSURE

The present disclosure relates to fraud detection in telephony systems, and, more particularly to a fraud detection system that detects a fraudulent call, including a fraudulent call answered by a call center, and a method therefor.

BACKGROUND OF THE DISCLOSURE

Call center fraud has been growing at an alarming rate over the past few years. There are many reasons for this growth. Some of the main reasons for this growth include an increased robustness of web and mobile application security, and the introduction of chip cards by the credit card industry, thereby causing fraudsters to seek easier opportunities elsewhere. The telecom field is one such area, which has historically had much weaker security awareness and defenses.

The deregulation of the telecom industry coupled with the rise of voice-over-Internet-Protocol (VoIP) has caused the traditional telephony network to be exposed to technologies that it was not originally designed for. This includes the ability to spoof caller identifications (IDs), launch large-scale attacks through automated telephony applications, and to fake personal identities.

The traditional authentication method used by call center agents is one of knowledge-based-authentication (KBA), which relies on call center agents asking the caller to answer questions to which they alone would know the answers. However, the easy availability of personal information through Internet search engines, data breaches in government and corporate networks, and various social media websites, has given fraudsters the ability to gather a wide variety of data, thereby providing them with the ability to convince call center agents that they indeed are who they are pretending to be. Given that that their primary function is to assist customers, call center agents are particularly vulnerable to social engineering practices used by fraudsters. All of these factors have contributed to a steady and steep increase in call center fraud.

Many existing fraud detection systems use a fraudster database (also referred to as a fraud database) containing fraudster profiles. Whenever a new call is processed, a fraudster database is referenced to verify if a match can be found in the database for the current caller. The lookup may be based on a variety of approaches, such as, for example, a voice print or a phone print, or another biometric, but the overall approach has remained relatively constant in involving the lookup against a fraudster database. These approaches are typically based on three essential requirements being met, including: (1) a fraud must have taken place earlier for a fraudster profile to be created; (2) the incident that occurred should have been identified as fraud by a fraud specialist (or team); and (3) the incident should then be reported along with all relevant data to the fraud detection system, so that a fraudster profile can be created or updated in the fraudster database.

Disadvantages of the foregoing approaches are immediately obvious. For instance, the system can only detect fraud when: a new incident of fraud is perpetrated by a fraudster who is already present in the fraudster database; when the fraudster's actions were successfully identified in the past as fraud; and/or when a fraud incident was successfully submitted to the fraud detection system using a feedback loop or a fraud notification system. When any of the aforenoted requirements are not met, regardless of the sophistication of the technology employed to establish an identity of the caller so that a lookup can be done, the system is unable to meet the expected behavior.

The disclosure provides a novel system and method that overcome the disadvantages discussed above, and that meet an unfulfilled need for effectively and efficiently rating the fraud risk associated with an incoming call, including a fraudulent call made to a call center.

SUMMARY OF THE DISCLOSURE

According to an aspect of the disclosure, a fraud detection (FD) system and a fraud detection (FD) method are disclosed. The FD system and method may be implemented in a communication system such as, for example, a telephony platform, to define knowledge based heuristic rules and apply the rules to caller histories to detect fraud. The FD system and method may include fuzzy sets to represent various analytical metrics computed from caller histories. The FD system and method may use fuzzy logic to compute and combine fraud risk from a plurality of analytical metrics.

The FD system and method may include analysis of call detail records (CDRs) that are generated in the communication system. The analysis may be based on collecting, organizing, transforming, analyzing, and/or quantifying CDR data from the CDRs into a plurality of data analytics and data correlations and then applying fuzzy logic to the data analytics to generate a fraud risk rating for each incoming call in the communication system.

The FD system may include a Data Extractor Module (DEM or data extractor), a CDR Database, a History Generator and a History Database. The DEM module may be connected to the CDR Database at regular intervals to extract CDR records written to and stored in the CDR Database since the time of the last extraction. The DEM module may arrange the retrieved CDR records that are related to each other into conversations. The History Generator may transform each conversation containing many CDR records into a single interaction record—that is, a History Record (HR). Each History Record may be written to the History Database.

The FD system may include a Caller Analytics Module (CAM or call analyzer), a Watch List Generator Module (WLGM), a Statistical Analysis Module (SAM or statistical analyzer), and a Data Analytics Database. The CAM module may query the History Database for data and process the data into a collection of analytics—namely, Caller Analytics Records (CAR)—which may be written to a Temporary Storage as, for example, temporary disk files. The Watch List Generator Module (WLGM) may process the CAR records by first sorting and then computing the frequency distributions of the various analytical metrics in the CAR records. The frequency distributions may be used to identify outlier clusters of callers and thereby populate Fraudster Watch Lists.

The SAM module may process the CAR records in the Temporary Storage and generate a collection of statistical metrics that describe the collective behavior of callers in a multitude of contexts—namely, Analytic Facets (AF). A number of AFs may be defined by the FD system, so that a collective behavior may be determined separately in different ways—such as, for example, for the entire communication system, for an individual application, for a group of similar applications belonging to a specific client, and so on. The data analytics for all the AF facets may be written to an Analytics Database.

According to one embodiment of the disclosure, an FD system is provided for use in, or with a communication system where CDRs are generated for calls being serviced by the communication system, the FD system comprising: a CDR Database that stores and archives CDR records; a Data Extraction Module (DEM or data extractor) that queries and reads CDR records from the CDR Database and represents a plurality of CDR records as a single conversation representing a unique interaction of a caller with the communication system; a History Generation Module (HGM or history record generator) that transforms a conversation with a plurality of CDR records into a single interaction record (a History Record); a History Database that stores a plurality of History Records; a Caller Analytics Module (CAM or call analyzer) that queries and reads History Records from the History Database and processes the read History Records into a plurality of data analytics using different analytical facets to process the available History Records once for each analytical facet; a Watch List Generation Module (WLGM or watch list generator) that uses frequency distributions of different data analytical metrics to identify outlier clusters of callers in each frequency distribution to build fraud watch lists; a Statistical Analytics Module (SAM or statistical analyzer) that uses the data analytical metrics to compute sum, mean, variance, and standard deviation of the various analytical metrics across a plurality of analytical facets, and then to generate Data Analytics Records (DAR); an Analytics Database that stores and archives Data Analytics Records; a subscription mechanism to obtain CDR network events in real time (such as, for example, from one or more CDR servers); and/or a fraud monitoring triggering mechanism that is enabled by CDR events (such as, for example, arriving from one or more CDR servers).

The FD system may be configured to collapse a plurality of CDR records into a single interaction record (a History Record), wherein the History Record may be a different representation of the data contained in the CDR records.

The FD system may analyze a plurality of analytical metrics, including: a total number of calls made by a caller; a total number of applications called in to by a caller; a total amount of time (e.g., number of minutes) expended by a caller on the communication system; a total number of call legs involving a caller; a number of predetermined time periods (e.g., unique days) during which the caller has made (i) 1 or 2 calls, (ii) 3 to 5 calls, (iii) 6 to 10 calls, (iv) 11 to 20 calls, or (v) more than 20 calls; a number of time periods wherein the caller has not interacted with the communication system, which may be expressed as, e.g., days; a total time period (e.g., in days) that a caller has not interacted with the communication system; and/or a total length of caller's history, which may be expressed, e.g., in days.

The analytical metrics may be processed and statistical metrics generated that describe the collective behavior of calls in a multitude of contexts (or aspects), including an all-inclusive facet, an interactive voice response (IVR) facet, and/or an IVR-group facet. For the all-inclusive facet (or context), a collective behavior of callers may be determined based on the entire communication system. For an IVR facet, the collective behavior of callers to an individual application belonging to a client may be determined. For an IVR-group facet, the collective behavior of callers to a group of applications belonging to a specific client may be determined. The data analytics for all the AF facets may be written to the Analytics Database.

The FD system may represent analytical metrics as linguistic variables. The FD system may use fuzzy logic terms to represent the linguistic variables as fuzzy sets.

The FD system may include knowledge-based rules that allow the analytical metrics to be included as antecedents of rules with the consequent part of the rules yielding a fraud risk score.

The FD system may include knowledge-based heuristics rules for analyzing Originating Line Information (OLI) data from call metadata to identify a fraud risk score. The knowledge-based heuristics rules may include determining inconsistency of OLI values across a caller's history in determining the fraud risk score. The FD system may quantify inconsistencies of OLI data across a caller's history and express the quantity(ies) as a linguistic variable with values that may be modeled as a fuzzy set.

The knowledge-based heuristics rules may be applied to Jurisdiction Information Parameter (JIP) data parsed from call metadata as a means of identifying a fraud risk score. The knowledge-based heuristics rules may be applied to determine inconsistencies of JIP values across the caller's history and assess fraud risk score when the caller has a fixed OLI value indicating a land-line.

The knowledge-based heuristics rules may be applied to JIP data parsed from call metadata as a means of identifying fraud risk score, where inconsistencies of JIP values across the caller's history are translated to a geographical scatter using LERG data and inconsistencies are quantified and expressed as a linguistic variable whose values are expressed as a fuzzy set.

The FD system determines an overall fraud risk score by accumulating all the individual fraud risk scores from knowledge-based heuristics and analytical metrics using fuzzy set representations for the input values.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 11 shows an example of fuzzy sets that may be used in the FD system;

FIG. 12 shows an example of fuzzy membership functions that may be used in the FD system.

Figure 1:
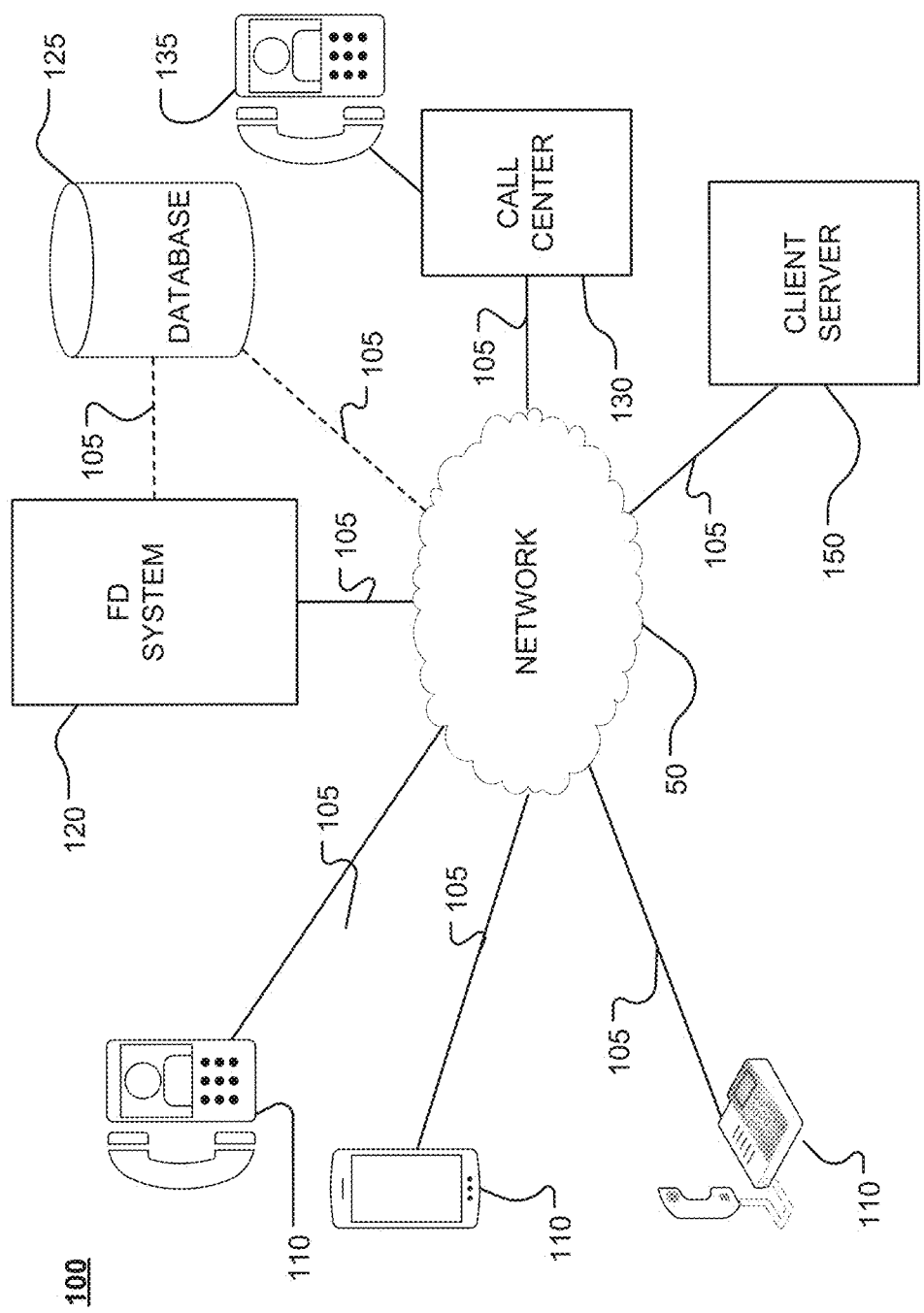
FIG. 1 shows an example of a communication system, constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of a communication system 100, constructed according to the principles of the disclosure. The communication system 100 may comprise a telephony platform. The communication system 100 includes, for example, one or more communication (or caller) devices 110, a fraud detection (FD) system 120, a call center 130 and a network 50, all of which may be communicatively connected via communication links 105. The call center 130 may include one or more caller agent devices 135.

The communication system 100 may further include a database 125, which may be located in, or local to the FD system 120, or remotely. The database 125 may be coupled directly to the FD system 120 via a communication link 105, or through the network 50 and a communication link 105. The FD system 120 may include one or more computers and/or one or more servers.

The communication system 100 may further include a client server 150, which may be communicatively coupled in the communication system 100 via a communication link 105. The client server 150 may belong to a client, such as, for example, a subscriber, a service provider, a financial institution, a retailer, a vendor, a merchant, a product supplier, a manufacturer, a corporation, a university, a government agency, an individual, or any entity that may benefit from identifying fraudulent calls in a communication system. The client server 150 may be located at a virtual or physical site belonging to the client.

The communication (or caller) device 110 and the caller agent device 135 may include, for example, a land-line telephone, a mobile phone, a smart phone, a cellular phone, a satellite phone, a voice-over-Internet-Protocol (VoIP) phone, a computer having video and/or audio reception and production capabilities, or the like. A call may be initiated from the communication device 110 (or the caller agent device 135) and a call signal transmitted via the communication link 105 and network 50. The call signal may include metadata such as, for example, SIP-T data, including, for example, originating line information (OLI) data, calling party number (CPN) data, forward call indicator (FCI) data, circuit identification code (CIC) data, automatic number identification (ANI) data, dialed number identification service (DNIS) data, jurisdiction information parameter (JIP) data, diversion data, signaling information field (SIF) data, and the like. The call signal may include one or more voice signals, including, for example, a voice signal generated by the caller device 110 based on a caller (not shown) speaking into the caller device 110, an interactive voice response (IVR) voice signal, a voice signal generated by the caller agent device 135 based on an agent (not shown) speaking into the caller agent device 135, or the like.

Referring to FIG. 1, when an inbound call is received by the FD system 120 from a caller device 110, a dialed number identification service (DNIS), or the like, may be used to look up and identify an interactive voice response (IVR) that should answer the call and/or interact with the caller along with the client (e.g., client server 150) who owns or subscribes to fraud detection services rendered by the FD system 120. The client identity may be used by the FD system 120 to look up a fraud risk profile (FRP) associated with the client to determine a fraud risk treatment to be given to the call. This determination may be made individually for each incoming call.

Figure 2:
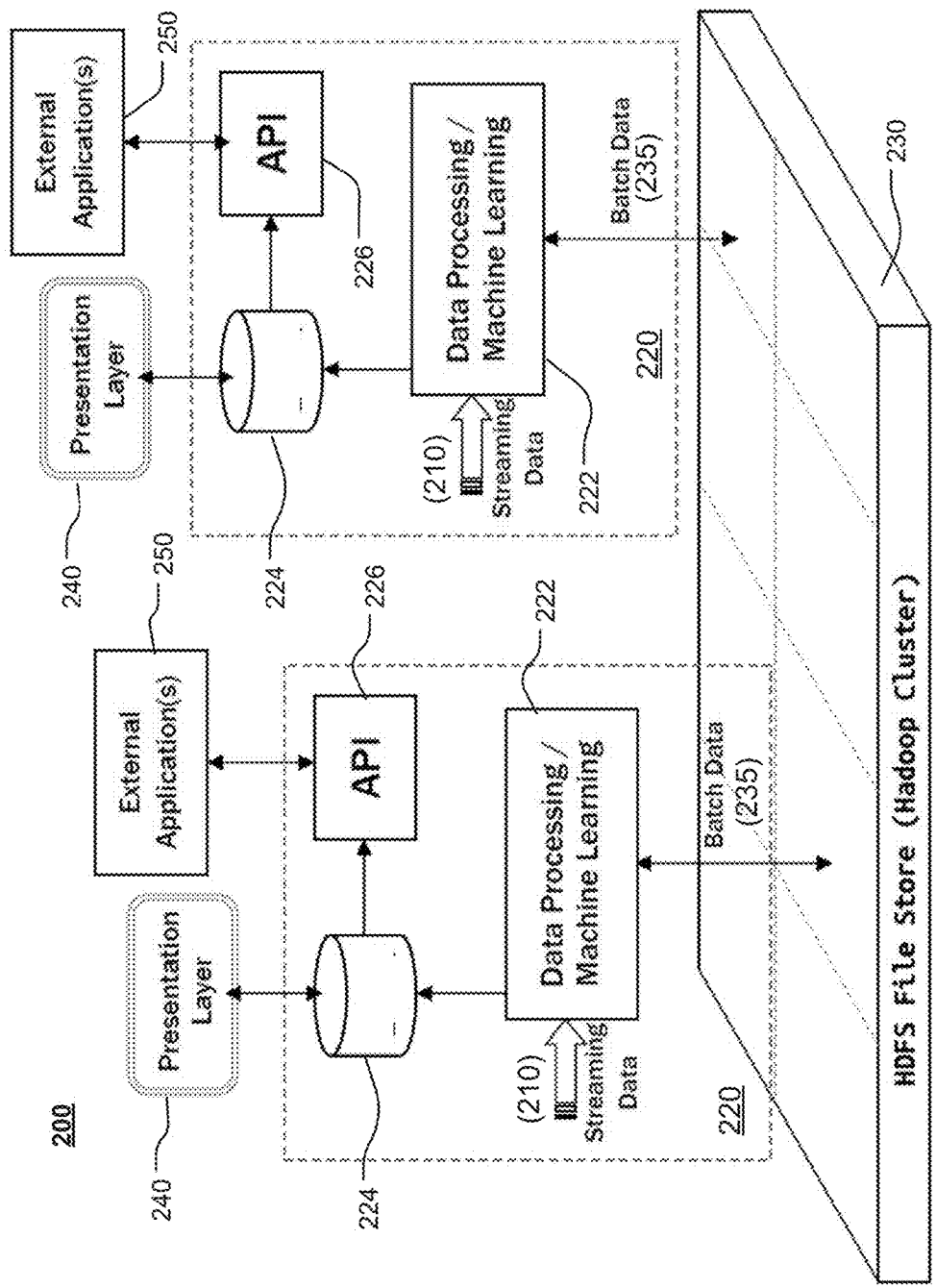
FIG. 2 shows an example of an analytics platform that may be included in a fraud detection (FD) system in the communication system of FIG. 1.

FIG. 2 shows an example of a unified analytics platform (UAP) 200 that may be included in the communication system 100 (shown in FIG. 1); and, more particularly, in the FD system 120. The UAP 200 may include one or more data interfaces 220 that receive streaming data 210 and send/retrieve batch data 235 to/from a storage 230. The storage 230 may include a Hadoop distributed file system (HDFS) file store. The data interface(s) 220 may be coupled to a graphic user interface (GUI) (not shown) through one or more presentation layers 240. The data interface(s) 220 may be coupled to one or more external applications 250.

The data interface 220 may include a data processing/machine learning module 222, a database 224 and one or more application programming interfaces (APIs) 226. The database 224 may be communicatively coupled to the data processing/machine learning module 222, the presentation layer 240 and/or the API 226. The API(s) 226 may be coupled to the database 224 and/or the one or more external applications 250.

Referring to FIGS. 1 and 2, the communication system 100 may generate vast amounts of data from a multitude of sources, including the communication device(s) 110, the call center 130, and/or the client server 150. This data may be received as streaming data 210 and stored in the storage 230 as raw data. The raw data may be retrieved by the data interface(s) 220, cleaned, transformed, manipulated, processed, compressed and/or reduced through analytics, as described in greater detail below. The data stored in storage 230 may include application logs, Call Detail Records (CDRs), CDR events, call recordings, call miner data, call quality metrics (e.g., Voice Clarity Measurement Enhancement (VCME)), Contextual User Experience (CUE) events, voiceID data, or the like. The storage 230 may include partitions, so that partitions can be moved out of the storage 230 when they are no longer relevant, thereby allowing for efficient management of the storage 230.

The data in the storage 230 may be retrieved, processed and output to a GUI (not shown) to be viewed and/or reproduced via one more external applications 250. The UAP 200 allows for analytics efforts that can be reused, thereby providing, even in very complex undertakings, a solution that can be quickly assembled from existing analytics. Every analytics effort, regardless of whether it is a batch processing job or a stream oriented job, and whether the outputs are stored in a database or reflected in a graphical interface of some kind may also provide an API that allows programmatic access to it.

The API 226 may include, for example, a Representational State Transfer (REST) API, or the like. The REST API can integrate web telephony into the communication system 100 (shown in FIG. 1), including telephony features such as, for example, making a phone call, receiving a phone call, receiving call notifications, and the like. Solution architectures may be defined in terms of the existing APIs 226, and higher level APIs 226 may be built from lower level APIs.

Figure 3:
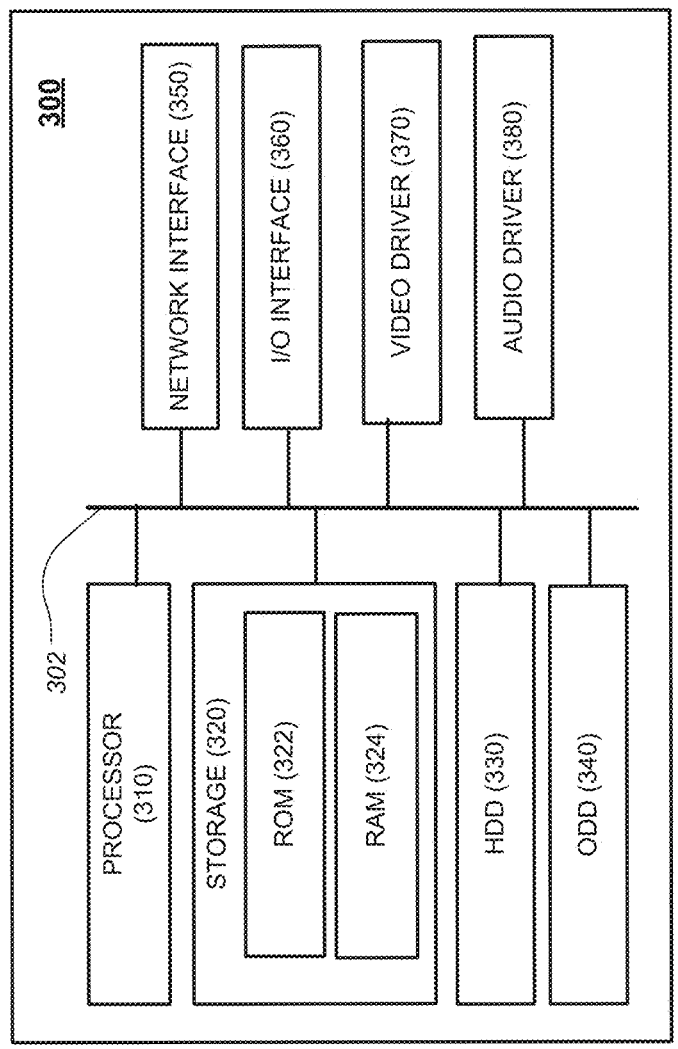
FIG. 3 shows a block diagram of an example of a fraud detector device that may be included in the FD system and that is operable to execute the disclosed architecture.

FIG. 3 illustrates a block diagram of a fraud detector (FD) device 300 operable to execute the disclosed architecture, according to the principles of the disclosure. The FD device 300 may be provided in the FD system 120 (shown in FIG. 1).

Referring to FIG. 3, the FD device 300 is configured to implement the various aspects of the FD system 120 disclosed herein. The FD device 300 includes a processor 310, a system storage 320, and a system bus 302. The system bus 302 couples system components including, but not limited to, the system storage 320 to the processor 310. The processor 310 can be any of various commercially available processors. Dual microprocessors and other multi-processor architectures may also be employed as the processor 310.

The system bus 302 can be any of several types of bus structures that may further interconnect to a memory bus (with or without a memory controller), a peripheral bus, and a local bus using any of a variety of commercially available bus architectures.

The system storage 320 includes a read only memory (ROM) 322 and random access memory (RAM) 324. A basic input/output system (BIOS) may be stored in the ROM 322, which may include a non-volatile memory, such as, for example, ROM, EPROM, EEPROM, or the like. The BIOS contains the basic routines that help to transfer information between elements within the computer 300, such as during start-up. The RAM 324 may include a high-speed RAM such as static RAM for caching data.

The FD device 300 includes an internal hard disk drive (HDD) 330, such as, for example, an enhanced integrated drive electronics (EIDE) drive, a serial advanced technology attachments (SATA) drive, or the like, and an optical disk drive (ODD) 340 (e.g., for reading a CD-ROM disk (not shown), or to read/write to other high capacity optical media such as the DVD). The HDD 330 may be configured for external use in a suitable chassis (not shown). The HDD 330 and ODD 340 can be connected to the system bus 302 by a hard disk drive interface (not shown) and an optical drive interface (not shown), respectively. The hard disk drive interface (not shown) may include a Universal Serial Bus (USB) (not shown), an IEEE 1394 interface (not shown), and the like, for external applications.

The HDD 330 and/or ODD 340, and their associated computer-readable media, may provide nonvolatile storage of data, data structures, computer-executable instructions, and the like. The HDD 330 and/or ODD 340 may accommodate the storage of any data in a suitable digital format.

A number of program modules, including the modules described in greater detail hereinbelow, can be stored in the HDD 330, ODD 340, and/or RAM 324, including an operating system (not shown), one or more application programs (not shown), other program modules (not shown), and program data (not shown). Any (or all) of the operating system, application programs, program modules, and program data may be cached in the RAM 324.

The FD device 300 includes a network interface 350 and an input/output (I/O) interface 360. The FD device 300 may receive commands and data via the I/O interface 360, which may be communicatively coupled to one or more input/output devices, including, for example, a keyboard (not shown), a mouse (not shown), a pointer (not shown), a microphone (not shown), a speaker (not shown), a display (not shown), and/or the like. The received command and data may be forward to the processor 310 from the I/O interface 360 via the bus 302.

The FD device 300 may include a display device (not shown). The display device may be connected to the system bus 302 via the I/O interface 360. The display device (not shown) may be connected to the video driver 370 via the system bus 302.

The FD device 300 may include a sound reproduction device (not shown), such as, for example, a speaker. The speaker (not shown) may be connected to the system bus 302 via the I/O interface 360. The speaker (not shown) may be connected to the audio driver 380 via the system bus 302.

The network interface 350 may be connected to the network 50 (shown in FIG. 1). The network interface 350 may include a wired or a wireless communication network interface (not shown) and/or a modem (not shown). When used in a local area network (LAN), the computer 300 may be connected to the LAN network 50 (shown in FIG. 1) through the wired and/or wireless communication network interface; and, when used in a wide area network (WAN), the computer may be connected to the network 50 (shown in FIG. 1) through the modem. The modem (not shown) can be internal or external and wired or wireless. The modem may be connected to the system bus 302 via, for example, a serial port interface (not shown).

A call detail record (CDR) may include a compound data element that includes detailed information regarding each call received from a caller device 110 (or caller agent device 135) (shown in FIG. 1), such as begin time, connect time, call duration, calling number, called number, identity of the server hosts in the call flow, call completion status, and other such data. CDR data may be computed from one or more billing events reported by various Session Initiation Protocol (SIP) applications (or agents) involved in a particular call.

Figure 4:
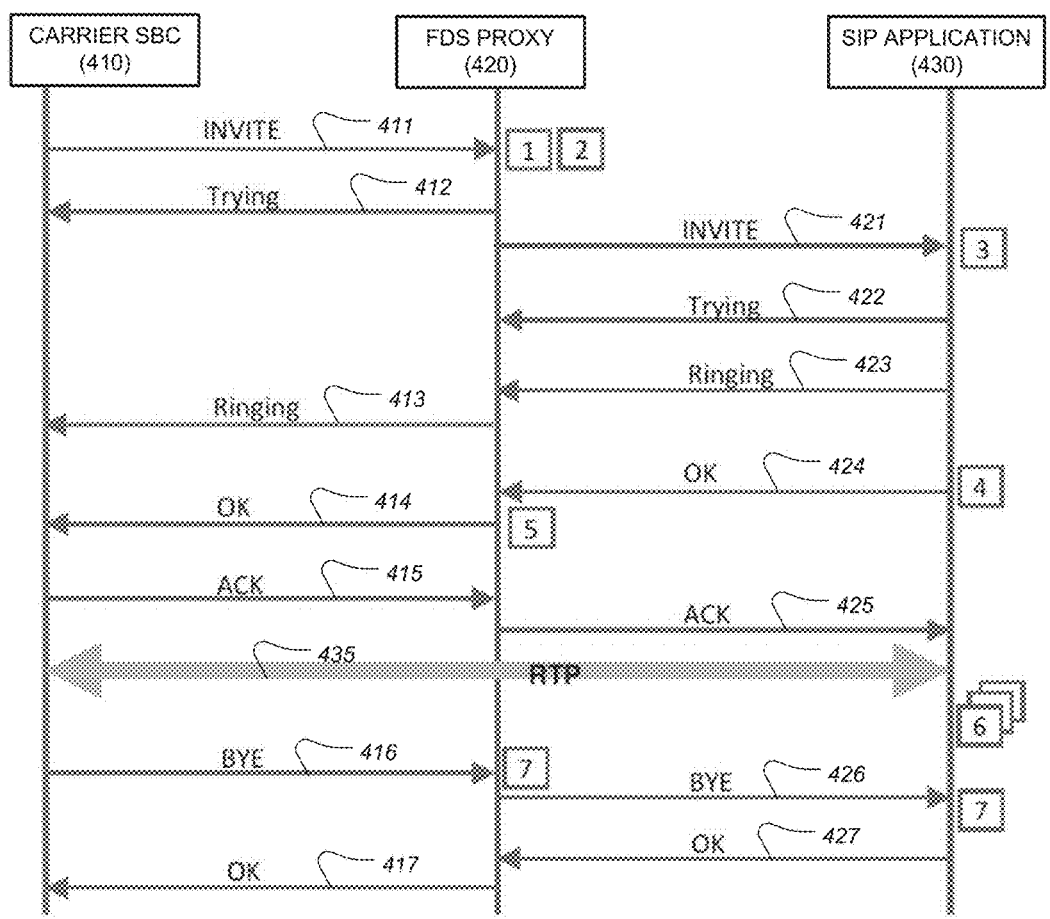
FIG. 4 shows an example of CDR event generation for a simple inbound call from a caller device in the communication system of FIG. 1.

FIG. 4 shows an example of CDR event generation for a simple inbound call, with the FD device 300 (shown in FIG. 3) serving as an FD system (FDS) proxy (420). At various points during the call, one or more SIP agents (430) involved in handling the inbound call may generate CDR events that capture essential information about the progress of the call and data related to the call's billing and reporting. These events are sent to the CDR system by the SIP agents (or applications) (430) using a CDR dispatch interface, which may be provided, for example, as libSIPCDR.so, which may be a shared library loaded by the SIP applications in the communication system 100 (shown in FIG. 1).

In FIG. 4, the boxed numbers show examples of time points at which the SIP agents 430 generate the CDR events. The names of the events and the information contained in them are shown in TABLE 1 below.

TABLE 1

| Event # | Event Name | Included Information |
|---|---|---|
| 1 | Call Start Send | CallId, host, time, Parent call, is new, dnis, ani, board, trunk, port, from, to |
| 2 | Proxy Hop | CallId, host, time, carrier |
| 3 | Call Start Receive | CallId, host, time, dnis, ani, board, trunk, port, from, to |
| 4 | Auth | CallId, AppId, JobId |
| 5 | Call Connect | CallId, host, time |
| 6 | AppNav (multiple) | CallId, host, time, sequence number, key, value, outcome |
| 7 | Call Stop | CallId, host, time, reason |

Referring to FIGS. 1, 3, and 4 concurrently, an invite signal ("INVITE") 411 destined for, for example, the call center 130 (or client 150), may be received at the FD system 120 (FDS Proxy 420) from, for example, a Carrier Session Border Controller (SBC) 410 for an inbound call from a caller device 110. The Carrier SBC 410 may be responsible for initiating, controlling, and tearing down signaling, including media streams. More particularly, the Carrier SBC 410 may facilitate setting up, conducting and tearing down telephone calls, including Interactive Voice Response (IVR) communications.

CDR events 1 and 2 may be generated upon the FDS Proxy 420 receiving the invite signal 411 from the Carrier SBC 410. As seen in TABLE 1 above, the CDR event 1 may include a Call Start Send instruction, and CDR event 2 may include a Proxy Hop instruction. The FDS Proxy 420 may respond to the Carrier SBC 410 with a response ("Trying") signal 412.

The FDS Proxy 420 may forward the invitation ("INVITE") signal 421 to an SIP application 430, at which point a CDR event 3 may be generated, which may include a Call Start Receive. The SIP application 430 may respond to the invitation signal 421 with a response ("Trying") signal 422. The SIP application 430 may respond to the invitation signal 421 with a further response ("Ringing") signal 423.

The FDS Proxy 420 may receive the further response signal 423 from the SIP application 430 and send a further response ("Ringing") signal 413 to the Carrier SBC 410. After the SIP application 430 sends the response signal 413, a CDR event 4 may be generated, which may include an authorization ("Auth"), and an approval ("OK") signal 424 may be sent to the FDS Proxy 420.

After the FDS Proxy 420 receives the approval signal 424 from the SIP application 430, a CDR event 5 may be generated, which may include a Call Connect, and the FDS Proxy 420 may send an approval ("OK") signal 414 to the Carrier SBC 410.

The Carrier SBC 410 may acknowledge receipt of the approval signal 414 and respond by sending an acknowledgement ("ACK") signal 415. The FDS Proxy 420 may receive acknowledgement signal 415 and send the acknowledgement ("ACK") signal 425 to the SIP application 430. After the acknowledgment signal 425 is received at the SIP application 430, communication may occur bi-directionally via, for example, Real-time Transport Protocol (RTP) 425, thereby conveying audio, video, and the like over the network 50 (shown in FIG. 1). During the call, the SIP application 430 may generate zero or more AppNav CDR events 6 containing data that is pertinent to the IVR operation and IVR interaction with the caller.

At completion of the call, a termination ("BYE") signal 416 may be sent from the Carrier SBC 410. After the FDS Proxy 420 receives the termination signal 416, a CDR event 7 may be generated, which may include a Call Stop. The FDS Proxy 420 may send a termination ("BYE") signal 426 to the SIP application 430. The CDR event 7 may be communicated to the SIP application 430. The SIP application 430 may respond with an approval ("OK") signal 427, which may be received by the FDS Proxy 420. After receiving the approval signal 427, the FDS Proxy 420 may send an approval ("OK") signal 417 to the Carrier SBC 410.

Figure 5:
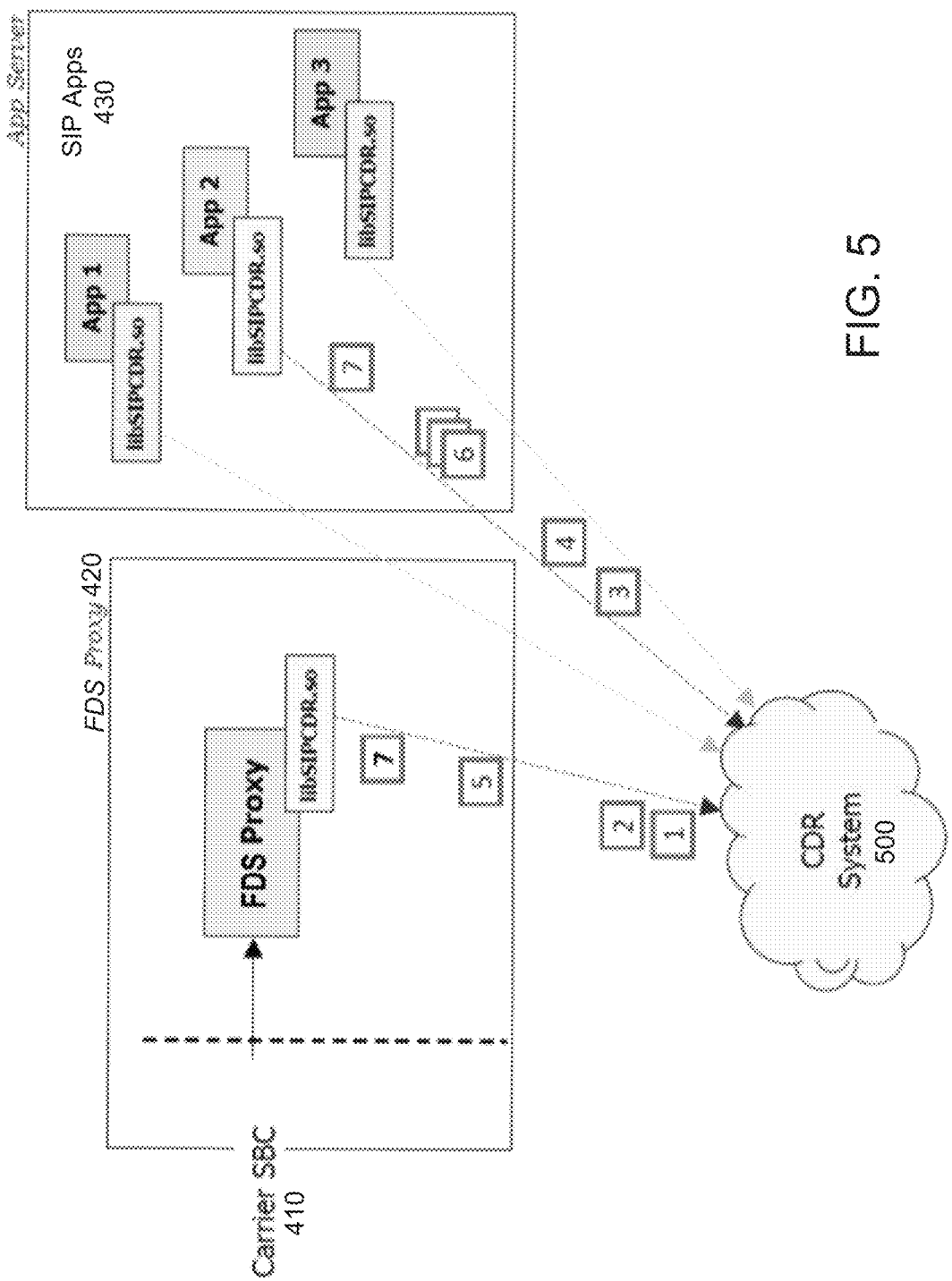
FIG. 5 shows an example of CDR event dispatch for a simple inbound call from a caller device in the communication system of FIG. 1.

FIG. 5 shows an example of a CDR event dispatch in the communication system 100 for a simple inbound call from a caller device 110 (shown in FIG. 1). As seen in FIG. 5, the communication system 100 (shown in FIG. 1) may include a CDR system 500. The CDR system 500 may be located in the FD system 120, or on one or more CDR servers (not shown) that may be located remote from the FD system 120. Each of the applications in the call flow shown in FIG. 4 may use a shared module, called "libSIPCDR.so," that enables each application in Carrier SBC 410, FDS Proxy 420 and SIP application(s) 430 to communicate CDR events to the CDR System 500.

The AppNav events (e.g., CDR event 6, in TABLE 1 above) may be wildcard events that can be used any number of times during a call to capture any data that is deemed pertinent (as seen, e.g., in FIG. 4). The AppNav events may be used to capture metadata from the initial INVITE message in the invite signal 411, which may include signaling and other metadata (e.g., SIP-T data) from, for example, a public switched telephone network (PSTN). Examples of such metadata include Originating Line Information (OLI), which describes the line type, and Jurisdiction Information Parameter (JIP), which points to the telephone network central office or the central office switch that processed the call for the carrier.

Figure 6:
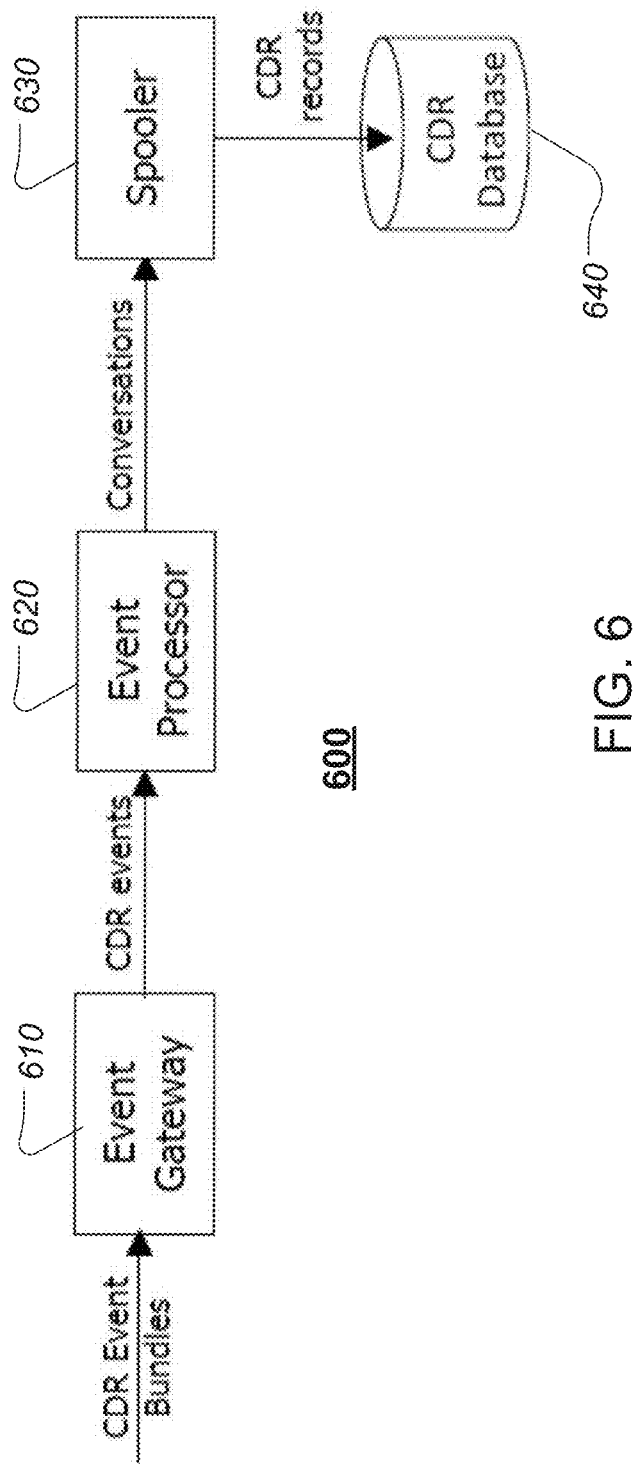
FIG. 6 shows an example of a CDR event processing system.

FIG. 6 shows an example of a CDR event processing system 600 that may be included in the CDR system 500 (shown in FIG. 5). The CDR event processing system 600 may include an Event Gateway module 610, an Event Processor module 620, a Spooler module 630 and a CDR Database 640. CDR events dispatched by the various applications (e.g., shown in FIG. 5) that are involved in call flows may be received by the Event Gateway module 610. The CDR events may be sent to the Event Gateway module 610 as bundles by libSIPCDR.so and processed by the Event Gateway module 610 into individual CDR events. The individual CDR events may be queued to the Event Processor module 620 from the Event Gateway module 610. The Event Processor module 620 may first organize the received CDR events by call leg, and then the various call legs by conversation, which the Event Processor module 620 may forward to the Spooler module 630.

A conversation is a hierarchical representation of calls that are related to each other. An incoming call from a caller device 110 (shown in FIG. 1), for example, may be answered by an IVR (not shown) and then the calling device 110 may be transferred to a caller agent device 135 (shown in FIG. 1). In this scenario, there may be two calls and the second outbound call to the caller agent device 135 may be the child of the inbound call from the caller device 110 that was answered by the IVR (not shown). The conversation may be assigned an ID (conversation_id), which may always be the ID (call_id) of the first inbound call in the communication system 100. Each leg in a conversation, therefore, may have two IDs—e.g., the call_id of the call leg and the conversation_id for the entire conversation. When all legs within a conversation are completed, the Event Processor module 620 may process the conversation in its entirety and hand it off to the Spooler module 630. The Spooler module 630 may process the conversation into individual CDR records and write each of them to the CDR Database 640.

The CDR Database 640 may be populated with any number of CDR records (e.g., millions, billions, trillions, etc.). The CDR records in the CDR Database 640 may be associated with, for example, one of two (2) categories. The first category—cdr_call records—may contain information about call setup, call progression, information about the caller, information about the IVR application that answered the call, direction of call (e.g., inbound, outbound, internal), how the call terminated, total time duration of the call, connected duration of the call, etc. The second category—cdr_app_navigation records—may contain any other data that may be considered relevant, including, for example, how the caller navigated the IVR, DTMF presses, application states, speech analytics and outputs from various digital signal processor (DSP) modules (not shown), and so on. The outputs from various DSP modules may be received from, for example, the DSP modules described in U.S. Pat. No. 9,031,838, issued on May 12, 2015 and titled "Method and apparatus for voice clarity and speech intelligibility detection and correction," and/or U.S. Pat. No. 8,897,437, issued on Nov. 25, 2014 and titled "Method and system for improving call-participant behavior through game mechanics," both of which are hereby incorporated by reference in their entireties.

The data contained in CDR records may be extensive. The CDR records may be a central premise of the FD system 120, facilitating analysis of a plurality of records (e.g., millions, billions, trillions, etc.) in the CDR Database 640 to determine caller histories, call patterns, statistical metrics, and the like, and, thereby, detection of anomalous behaviors indicative of fraud. The CDR Database 640 may be located in the Database 125 (shown in FIG. 1).

Figure 7:
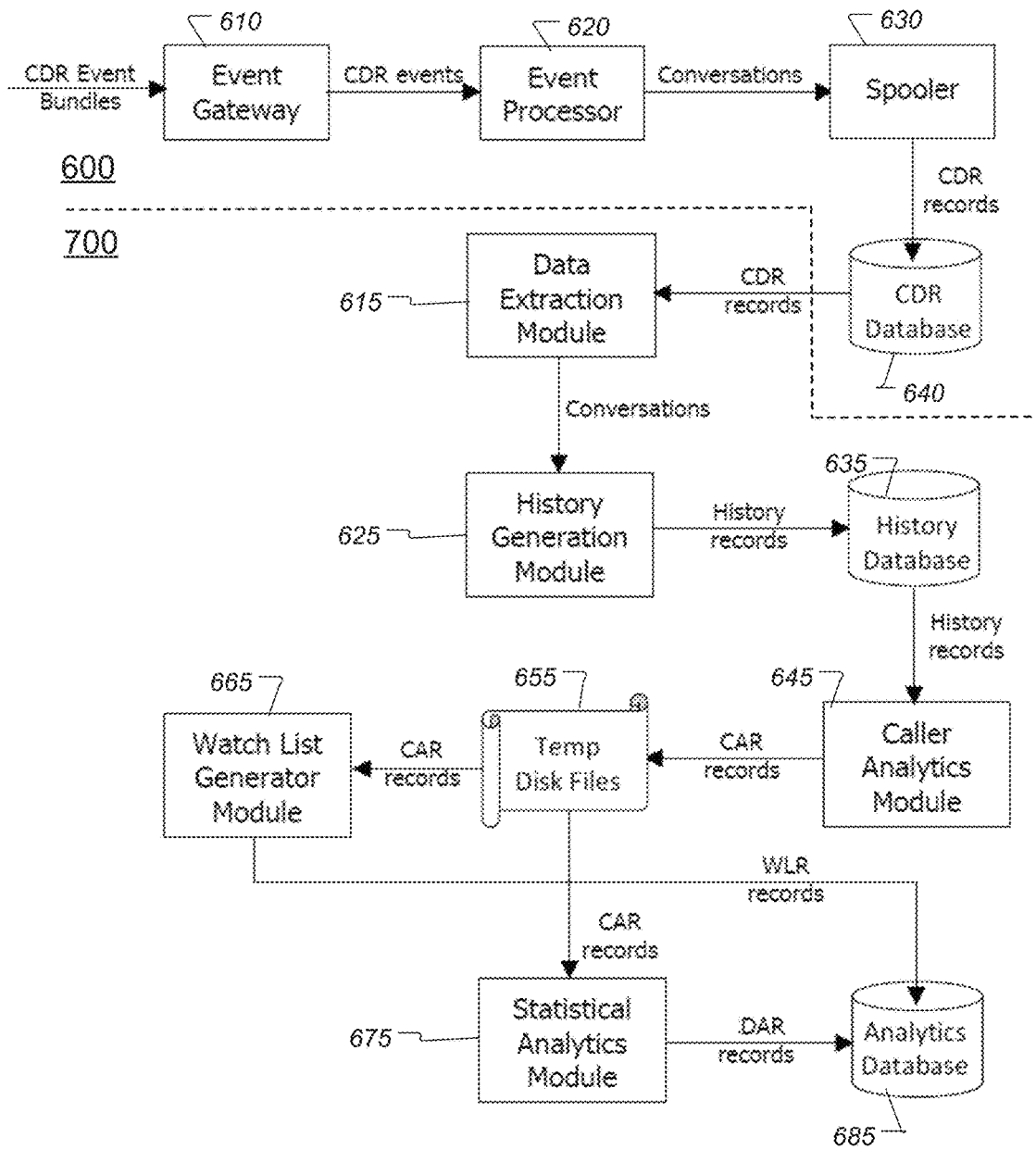
FIG. 7 shows an example of a History and Analytics system.

FIG. 7 shows an example of a history and analytics system 700 that may be included in the communication system 100 (shown in FIG. 1). The history and analytics system 700 may comprise a Data Extraction Module 615, a History Generation Module 625, a History Database 635, a Caller Analytics Module 645, a Temporary Storage 655, a Watch List Generator Module (or watch list generator) 665, a Statistical Analytics Module 675, and an Analytics Database 685. The history and analytics system 700 may be implemented to create and populate the History Database 635 and the Analytics Database 685. The History Database 635 and/or the Analytics Database 685 may be located in the Database 125 (shown in FIG. 1).

Referring to FIG. 7, the first component within the history and analytics system 700 may be the Data Extraction Module (DEM or data extractor) 615. The DEM module 615 queries the CDR Database 640 for CDR records, arranges the CDR records into conversations, and delivers the conversations to the History Generation Module (HGM or history record generator) 625. The HGM module 625 receives the conversations from the DEM module 615 and extracts various data from the CDR records within each conversation and collapses the extracted data into a single history record (History Record) representing a caller's interaction with the communication system 100 (shown in FIG. 1). The HGM module 625 writes the history records to the History Database 635.

Each history record may contain data, such as, for example, the calling number of the caller (ANI), the ID of the IVR that answered the call (app_id), the timestamp when the call was received in the communication system 100 (shown in FIG. 1) (begin_time), the total duration of the entire interaction, the line information (OLI), the Jurisdiction Information Parameter (JIP), and a summary of the conversation structure that includes the conversation ID, the number of call legs within it, and for each leg—the call ID, begin time, leg duration, and the application ID for that leg. A history record may include CDR data associated with each call in the communication system 100.

After the creation (or updating) of the History Database 635, baseline analytic metrics may be generated by the FD system 120 (shown in FIG. 1) by invoking the Caller Analytics Module (CAM or call analyzer) 645. TABLE 2 below illustrates examples of CAR metrics that may be generated by the CAM module 645. A role of the CAM may 645 may be to process the entire history of each caller in the History Database 635 and to create a single Caller Analytics Record (CAR) representing that caller's history. The CAR metrics may be defined as a collection of quantitative measures (or analytics metrics)—or simply metrics.

TABLE 2

| CAR Metric | Description |
| --- | --- |
| Number of Calls | Total number of calls made by a caller. |
| Number of Applications | Total number of IVR applications that the caller has called in to. |
| Total Duration | The total time in minutes that the caller has spent interacting with the platform. This includes the time spent interacting with IVR applications, hold times for agents, interactions with agents, etc. |
| Number of Call Legs | The total number of distinct call legs involving the caller. Taken in conjunction with the number of calls, this metric reflects on the average complexity of the caller's interaction with the FDS. |
| Number of Days with 1-2 Calls | The number of unique days on which the caller has made 1 or 2 calls in to the FDS. |
| Number of Days with 3-5 Calls | The number of unique days on which the caller has made between 3 and 5 calls in to the FDS. |
| Number of Days with 6-10 Calls | The number of unique days on which the caller has made between 6 and 10 calls in to the FDS. |
| Number of Days with 11-20 Calls | The number of unique days on which the caller has made between 11 and 20 calls in to the FDS. |
| Number of Days with 20+ calls | The number of unique days on which the caller has made more than 20 calls in to the FDS. |
| Number of Zero-Call Spans | The number of idle periods (contiguous days) during which the caller has not interacted with the FDS. |
| Total Zero-Call Span | The sum of all the zero-call spans expressed as days. |
| Known History Length | The total number of days spanned by the caller's earliest interaction to the time of the most recent interaction. Longer histories are more predictive & reliable than shorter ones. |

The CAM module 645 may take into consideration various analysis contexts (or Analytics Facets) that are of interest to the FD system 120. These analysis contexts allow the CAM module 645 to analyze and view the caller histories from different angles. The computations that yield the CAR records may be computed for each Analytics Facet for each caller in the History Database 635. TABLE 3 below illustrates examples of Analytics Facets that may be considered by the CAM module 645 during analysis. As seen in TABLE 3, the AFs may be defined by the FD system 120, so that a collective behavior may be determined separately in different ways—such as, for example, for the entire communication system, for an individual application, for a group of similar applications belonging to a specific client, and so on. More specifically, analytical metrics may be processed and statistical metrics generated that describe the collective behavior of callers in a multitude of contexts (or aspects), including the three examples shown in TABLE 3, including an all-inclusive facet, an interactive voice response (IVR) facet, and/or an IVR-group facet. For the all-inclusive facet (or context), a collective behavior of callers may be determined based on the entire communication system 100. For an IVR facet, the collective behavior of callers to an individual application (e.g., SIP application 430, shown in FIG. 4) belonging to a client may be determined. For an IVR-group facet, the collective behavior of callers to a group of applications belonging to a specific client may be determined.

TABLE 3

| Analytics Facet | Description |
| --- | --- |
| All-Inclusive | Process all available history records for each caller to generate the CAR records. There may be exactly one such CAR record for each caller in the History Database 635. |
| IVR | Process history records matching each IVR application that a caller has ever interacted with. There may be one CAR record for each application per caller. There may be a different number of these records for different callers. |
| IVR Group | Process history records matching each distinct group of IVR applications that a caller has ever interacted with. This facet allows analysis of caller histories in terms of their interactions with different categories of IVRs such as financial, insurance, auto clubs, pay-by-phone, etc. |

The CAR records generated by the CAM module 645 may be written to Temporary Storage 655 (e.g., as temporary disk files). The CAR records may be transient in nature, since the quantitative measures may be strongly coupled to the time frame used in the analysis.

The CAR data in the Temporary Storage 655 may be processed by a Watch List Generator Module (WLGM or watch list generator) 665. The WLGM module 665 may sort the CAR records once for each of the analytics metrics, including, for example, the Number of Calls, Number of Applications, Total Duration, Number of Days with 1-2, 3-5, 6-10, 11-20, and 20+ calls, as seen in TABLE 2 above. For each of these analytics metrics, a frequency distribution may be computed (e.g., number of callers for the metric) and the outlying clusters of callers in each of these distributions with improbably high usage patterns may be identified and the callers in each cluster may be added to a Watch List. The size of the Watch List may typically range from, for example, about 0.005% to about 0.01% of the callers in the History Database 635.

The generated Watch List Records (WLR) may be stored in the Analytics Database 685. Each WLR may be indexed by the caller (ANI) and the analytics metric ID (e.g., ID identifying the CAR metric). Each WLR may contain the threshold value for the analytic metric that caused the caller to be included in the Watch List. It is possible for multiple WLR records to be associated for a single caller.

The CAR data in the Temporary Storage 655 may be processed by a Statistical Analytics Module (SAM or statistical analyzer) 675 into Data Analytics Records (DAR). The SAM module 675 may process the CAR records in the Temporary Storage 655 by segmenting CAR files into different Analytics Facets based on the facet ID in the CAR record. The SAM module 675 may compute the sum, mean, variance, and standard deviation of the various analytical metrics across one or more analytical facets. The SAM module 675 may process the CAR records for all of the callers for each Analytics Facet and/or each analytics metric in two distinct passes. In the first pass, the SAM module 675 may compute the total and average values for each of the analytics metrics. The SAM module 675 may then make a second pass and compute the variance and standard deviation for each of the analytic metrics.

The DAR records may be indexed by the caller identity (ANI), the Analytics Facet ID (e.g., All-Inclusive, IVR, IVR-Group, etc.), and the analytics metric ID. Each DAR record may contain analytic metric data such as its average value across all callers for a particular analytic metric (and/or Analytic Facet), and its standard deviation across all callers for that analytic metric (and/or Analytic Facet). The SAM module 675 may write the DAR records to the Analytics Database 685. The DAR records may provide the benchmarks against which any given caller's history can be compared.

For each analytic metric, fuzzy set membership functions may be defined that allow the FD system 120 to reason about the actual values of the analytics metrics for any caller. These definitions may form the knowledge base for later inference of risk caused by each of these analytics metrics for any given caller. The analytics data in the DAR records may provide a logical basis for the membership functions for the fuzzy sets that are defined for the various analytics metrics.

A CAR metric, such as, for example, the Number of Applications, is a linguistic variable. The values that a linguistic variable can assume are called terms. The set of terms of a linguistic variable constitutes a fuzzy set. Each value of the linguistic variable belongs with some degree of certainty to one or more of the possible terms in a manner defined by their respective membership functions. The membership functions may be illustrated by considering one of the CAR metrics—for example, the Number of Applications, with the membership functions being similarly defined for all other CAR metrics.

Figure 8:
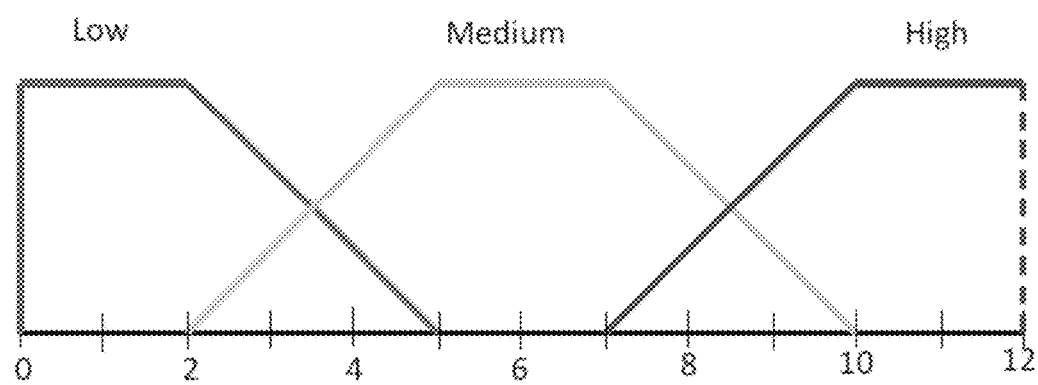
FIG. 8 shows an example of a fuzzy membership function implemented in the FD system.

FIG. 8 shows an example of a membership function having three (3) fuzzy sets defined for the Number of Applications CAR metric. As seen in FIG. 8, the membership function includes the following three sets:

(i) Low=Trapezoid: 0, 0, 2, 5
(ii) Medium=Trapezoid: 2, 5, 7, 10
(iii) High=Trapezoid: 7, 10, 300, 300 (or more)

Figure 9:
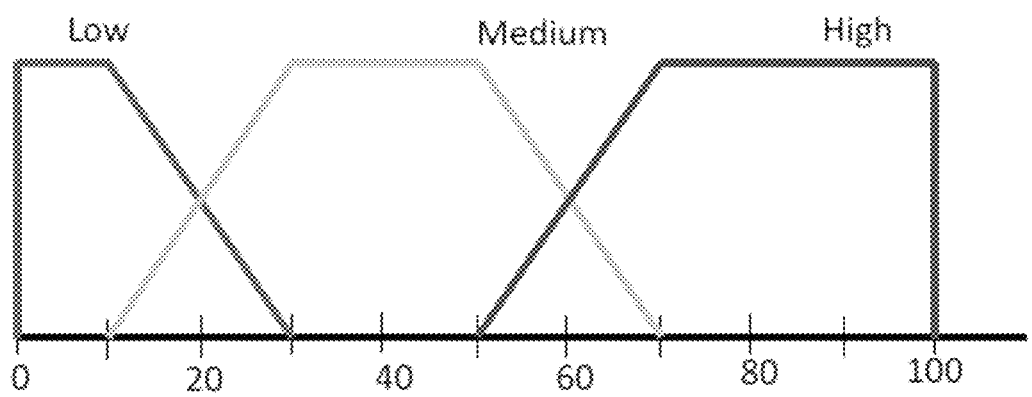
FIG. 9 shows an example of fraud risk expressed with fuzzy membership functions in the FD system.

FIG. 9 shows an example of membership functions for fraud risk, which may be expressed with terms of Low, Medium, and High with respect to a fraud risk score that may range from 0 to 100. Referring to FIG. 9, the fuzzy inferencing rules that use the above membership functions are shown below.

(i) IF NumOfApplications IS Low THEN Risk IS Low
(ii) IF NumOfApplications IS Medium THEN Risk IS Medium
(iii) IF NumOfApplications IS High THEN Risk is High Pursuant to Fuzzy logic theory, numeric values may be fuzzified to fuzzy terms, the fuzzy terms may be reasoned and combined, and then the outputs may be defuzzified to provide a precise numeric value, such as, for example, a fraud risk score. The individual fraud risk scores determined with respect to each analytics metric may be aggregated and used to determine an overall fraud risk score, by, for example, averaging all of the individual fraud risk scores.

With the availability of the History Database 635 (shown in FIG. 7) and the Analytics Database 685 (shown in FIG. 7), aspects of the FD system 120 may be described in greater detail.

The FD system 120 may continuously monitor call activity in the communication system 100 (shown in FIG. 1). The FD system 120 may continuously monitor all activity by, for example, registering itself as a subscriber within the communication system 100. For instance, the FD device 300 (shown in FIG. 3) may register itself as a subscriber within the communication system 100 via a system subscriber (not shown), as understood by those skilled in the art, which may obtain CDR network events in real time in the communication system 100, such as, for example, from one or more CDR servers (not shown).

Figure 10:
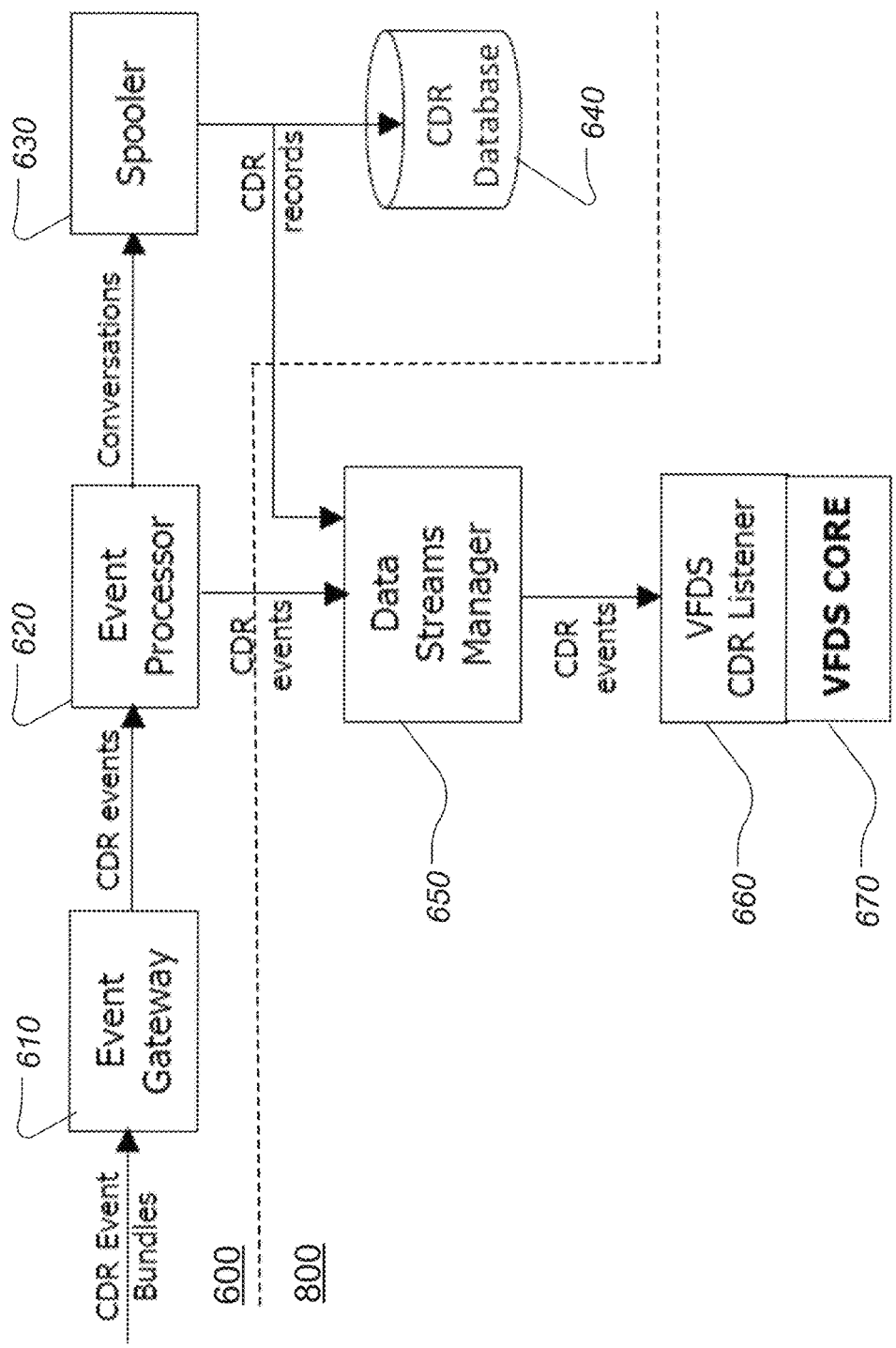
FIG. 10 shows an example of a CDR system.

Referring to FIGS. 5 and 10, the FD device 300 may register itself according to a subscription process that includes, for example, the CDR System 500 collecting data sent by the various call processing SIP applications 430 and organizing the data into categories. External applications 660 may subscribe to any combination of the categories of the data maintained within the CDR System 500. The subscription requests may be managed by the Data Streams Manager 650. Each individual subscription request may be serviced by the Data Streams Manager 650 using, for example, a dedicated TCP/IP socket connection that is opened by the Data Streams Manager 650 to the requesting external application. The requested data may be delivered as a continuous stream to the requesting application.

FIG. 10 shows an example of live data streaming system 800, which includes a Data Stream Manager 650, a VFDS CDR Listener 660, and a VFDS Core 670. The Data Stream Manager 650 allows every subscriber (or client) to request a custom stream of data that may then be delivered in real time to each subscriber (or client) via, for example, a Transmission Control Protocol (TCP) socket connection. The live data streaming system 800 may be located in the FD system 120 (shown in FIG. 1).

FD system 120 may further include a fraud monitoring triggering mechanism (or fraud monitor trigger receiver), as understood by those skilled in the art, that may be enabled by CDR events arriving to the FD system 120 from, for example, CDR servers (not shown). The fraud monitoring may be accomplished by setting up a monitoring context for each inbound call. Monitoring may involve adding newly arrived data for a call into its monitoring context and then checking if the newly added data allows the FD system 120 to make a fraud risk assessment in light of the newly added data. A fraud monitoring context exists from the time the inbound call is received until the time the entire conversation (i.e. all call legs created within the conversation) ends.

Referring to FIG. 10, which includes an example of a fraud monitoring mechanism, the live data streaming system 800 registers with the CDR event processing system 600 for a data feed containing raw CDR events. This enables the live data streaming system 800 to be constantly aware of the life cycle of every single call in the communication system 100 in real time. A call start event for a call leg with no parent leg indicates a brand new interaction of some caller with the communication system 100. This may be the trigger for the live data streaming system 800 to create a fraud monitoring context with that conversation ID. The fraud detection process need not be initiated, however. The live data streaming system 800 may wait for more CDR events (e.g., that usually follow closely the call start event) to arrive. These may include the Auth event, which provides the application ID. The cdr_app_navigation events providing the OLI and JIP information may also arrive within a short interval after that—if they are available for the call. The first fraud detection step may be taken, for example, a few seconds after the fraud monitoring context has been created for a brand new interaction.

The following table, TABLE 4, provides an example of the logic that may be used by the FD system 120 to determine a fraud score (and an overall fraud score), which may be used to detect fraud. In this regard, the fraud monitoring context may be created for a call and it may contain, for example, the calling number or ANI, the called number or DNIS, an application ID, OLI values, JIP values, and/or the like.

TABLE 4

| Logic Value | Description |
| --- | --- |
| 01 | Check if the ANI has a valid phone number format - either as US phone number or as an international number. If the phone number format is found valid, assign risk score of 100 to the call and return from analysis. |
| 02 | If the ANI is a valid US phone number, retrieve the central office switch location from the Local Exchange Routing Guide (LERG) database. If no record is found for the JIP value indicated by the ANI (i.e. the first 6 digits of the 10 digit phone number), then, the calling number indicates an illegal or inactive central office switch. Assign a risk score of 100 to the call and return from analysis. |
| 03 | Retrieve all the WLR records from the Analytics Database for this ANI. If the result set is non-empty, assign a risk score of 100 to the call and return from analysis. |
| 04 | Retrieve all the available History Records from the History Database for this ANI. |
| 05 | The consistency of the OLI may be verified as it occurs in the retrieved history records. The frequency distribution of OLI values may be computed and the fuzzy sets shown in FIG. 11 may be used to map the observed inconsistency to Fraud Risk. |
| 06 | If the line type as indicated by OLI for the call is a land line, then verification may be made whether the JIP is fixed. The frequency distribution of JIP values may be computed and the fuzzy sets shown in FIG. 11 may be used to map the observed inconsistency to Fraud Risk. |
| 07 | If the line type as indicated by the OLI is a cellular mobile device, check if the JIP does not change rapidly across calls that are close in terms of their timestamp. If the JIP shows variation, resolve each JIP value to a geographical coordinate using the V & H coordinate values in the Local |

TABLE 4-continued

| Logic Value | Description |
|---|---|
| | Exchange Routing Guide (LERG) database. Using these coordinates, compute the distance in miles between two JIP values in adjacent calls made from the cellular device. This check may be restricted significantly - as it is not a precise check. The intent may be to catch impossible situations where the JIP indicates a large geographical shift of caller's position within a very short time. For this reason, the check may be applied only when the time difference between two adjacent calls is less than 30 minutes and the geographical shift is more than 300 miles. The number of times this check fails may be counted and used to assign Fraud Risk using the membership functions shown in FIG. 12. |
| 08 | Finally, various metrics may be computed for the various facets that apply to this caller's history. Every caller may have at least 2 such facets. The first facet may be the one that covers the entire population of callers, and the second facet may be the one that applies to the IVR application implied by the application ID for the call. Other facets may apply if the application is also part of a facet spanning multiple applications. FD system computes the metrics for all the applicable facets and uses fuzzy reasoning rules specified in the system's configuration to compute the output risk for each input metric (for each facet). The individual outputs from the various input metrics are combined using fuzzy logic theory (centroid defuzzification). Output of each metric in each facet is accumulated into overall Fraud Risk rating score which includes contributions from steps 5-7 above. |

Figure 13:
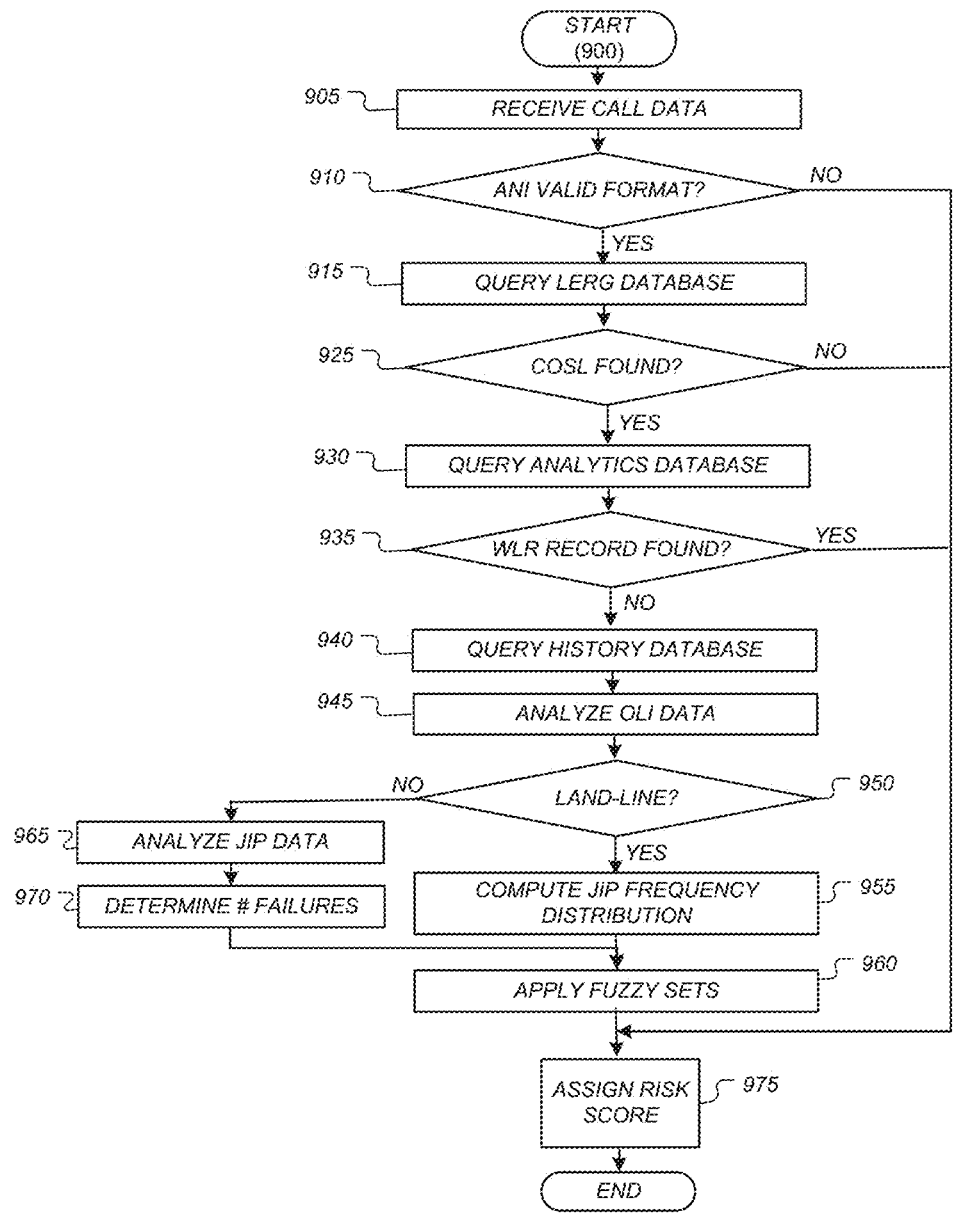
FIG. 13 shows an example of a process that may be carried out by the FD system to detect fraud.

FIG. 13 shows an example of a fraud detection process 900 that may be carried out by, for example, the FD system 120 to detect fraud. The following is a description of the fraud detection process 900, with references to FIGS. 1, 4, and 11-13.

Initially, upon receiving an incoming call signal (e.g., INVITE signal 411, shown in FIG. 4) from a caller device 110 (shown in FIG. 1), call metadata may be parsed from the received call signal, including, for example, ANI, DNIS, application ID, OLI values, and JIP values (Step 905, FIG. 13).

The ANI may be checked to determine whether it has a valid phone number format—either as a US number or as an international number (Step 910, FIG. 13). If the phone number format is found to be invalid (NO at Step 910), then a risk score may be assigned and stored for the analytic metric (Step 975), which, in this case, may be assigned a risk score of 100, and the process 900 may be ended.

If the phone number format is determined to be valid (YES at Step 910), then the Local Exchange Routing Guide (LERG) database may be queried for a central office switch location (COSL) associated with the particular ANI (Step 915). If no COSL record is found for the JIP value indicated by the ANI (i.e. the first 6 digits of the 10 digit phone number) (NO at Step 925), then it may be determined that the calling number indicates an invalid or inactive central office switch and a fraud risk score may be assigned and stored for the analytic metric (Step 975), which, in this case, may be assigned a fraud risk score of 100, and the process 900 may be ended.

If a COSL record is found for the JIP value indicated by the ANI (YES at Step 925), then the Analytics Database 685 (shown in FIG. 7) may be queried and all Watch List Records (WLR) records associated with the ANI may be retrieved (Step 930). If it is determined that the result set is non-empty for the queried WLR records (YES at Step 935), then a fraud risk score may be assigned and stored for the analytic metric (Step 975), which, in this case, may be assigned a fraud risk score of 100, and the process 900 may be ended.

If no WLR records are found in the Analytics Database 685 to be associated with the ANI (NO at Step 935), then the History Database 635 (shown in FIG. 7) may be queried for all records associated with the ANI, and all of the associated records may be retrieved (Step 940). The retrieved history records may be parsed and OLI data extracted for analysis. The OLI data may be analyzed to verify consistency of the OLI values as it occurs in the retrieved history records, and a frequency distribution of the OLI values may be computed (Step 945). Further, OLI data analysis (Step 945) may include processing the frequency distribution of OLI values using, for example, the fuzzy sets shown in FIG. 11 to map the observed inconsistencies to fraud risk and assign and store a fraud risk score (e.g., Low, Medium, High) for the analytic metric based on the fuzzy sets seen in FIG. 11 (Step 975).

In the example seen in FIG. 11, an OLI inconsistency count of: between 0 and 2 may be assigned a fuzzy fraud risk score of LOW, with the peak being at an OLI inconsistency count of 1; between 1 and 3 may be may be assigned a fuzzy fraud risk score of MEDIUM, with the peak being at an OLI inconsistency count of 2; and above 2 may be assigned a fuzzy fraud risk score of HIGH, with a peak value beginning at an OLI inconsistency count of 3 and remaining constant for all values above 3. Thus, if the retrieved history records reveal, for example, a single OLI inconsistency, then a fuzzy fraud risk score of LOW may be assigned and stored for the analytic metric (at Step 975).

Based on the analysis of OLI data (Step 945), a determination may be made as to whether the line type as indicated by OLI for the call is a land-line or cellular line (Step 950). If it is determine that the line type is a land-line (YES at Step 950), then a frequency distribution may be computed for the JIP values for the call (Step 955) and the fuzzy sets shown in FIG. 11 may be used to map the observed inconsistency to fraud risk for the analytic metric (Step 960) and assign and store a fraud risk score (e.g., LOW, MEDIUM, HIGH) for the analytic metric (Step 975).

If it is determined, however, that the line type is a cellular-line (NO at Step 950), then the JIP data may be analyzed (Step 965). When analyzing the JIP data, a determination may be made if the JIP changes rapidly across calls that are close in terms of their timestamp. If the JIP shows variation, then each JIP value may be resolved to a geographical coordinate using the V & H coordinate values in the Local Exchange Routing Guide (LERG) database. Using these coordinates, the distance in miles may be computed between two JIP values in adjacent calls made from the cellular device 110 (shown in FIG. 1). This check may be restricted significantly, as it is not necessarily a precise check. Accordingly, the FD system 120 may be able to catch impossible situations, such as, for example, where the JIP indicates a large geographical shift of a caller's position within a very short time. For this reason, the check may be applied only when the time difference between two adjacent calls is less than, for example, 30 minutes and the geographical shift is more than, for example, 300 miles. The number of times this check fails may be counted (Step 970) and the count value(s) may be mapped using, for example, the fuzzy sets shown in FIG. 12 to map the observed check fails to fraud risk (Step 960) and a fraud risk score (e.g., LOW, MEDIUM, HIGH) may be assigned and stored for the analytic metric (Step 975).

Finally, all of the fraud risk scores that were assigned and stored for the analytic metrics may be averaged to determine an overall fraud risk score (Step 975) for the call.

Further, at Step 975, various analytic metrics may be computed using, for example, a method similar to the process 900 (shown in FIG. 13) for each of the various aspect facets that apply to the particular caller's history (e.g., caller associated with call in FIG. 4). Every caller may have at least 2 such facets. The first facet may be the one that covers the entire population of callers, and the second facet may be the one that applies to the IVR application implied by the application ID for the call. Other facets may apply if the application is also part of a facet spanning multiple applications. The FD system 120 (shown in FIG. 1) may compute the analytic metrics for all the applicable facets and use fuzzy reasoning rules specified in the FD system's configuration (e.g., similar to the fuzzy rules described herein) to compute the output fraud risk score for each input analytic metric (for each facet). The individual outputs from the various input analytic metrics may be combined using fuzzy logic theory (centroid defuzzification). Output of each analytic metric in each aspect facet may be accumulated into an overall fraud risk rating score (at Step 975), which may include contributions from Steps 940 to 970 above.

The process 900, including each of the Steps 905 through 975, may be provided as computer executable code embodied in a computer readable medium that may be read and executed by, for example, the FD device 300 (shown in FIG. 3) to carry out the process 900 in the communication system 100. The computer readable medium may comprise a code section for each of the Steps 905 through 975, as well as code sections for each of the other processes/steps disclosed herein.

While the disclosure has been described herein in the general context of computer executable instructions that may run on one or more computers, those skilled in the art will recognize that the disclosure also can be implemented in combination with other program modules and/or as a combination of hardware and software. Generally, program modules include routines, programs, components, data structures, and the like, that perform particular tasks or implement particular data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosure may be practiced in distributed computing environments where certain tasks are performed by remote processing devices that are linked through a communications network. In a distributed computing environment, program modules can be located in both local and remote memory storage devices.

A "communication system," as used in this disclosure, means any telephone platform, including PSTN, cellular, satellite, or the like.

A "platform," as used in this disclosure, means any computer hardware, software, or combination of hardware and software, including, for example, computer hardware and operating system software.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication(s) link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G, 4G or 5G cellular standards, Bluetooth, or the like. A communication(s) link may include a public switched telephone network (PSTN) line, a voice-over-Internet-Protocol (VoIP) line, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A fraud detection system for a telephony platform where call data records (CDRs) are generated for calls being serviced by the telephony platform, the fraud detection system comprising:
   a call analyzer that (i) queries a history database for one or more history records associated with metadata in an incoming call signal from the caller device, (ii) retrieves from the history database the history records associated with the metadata in the incoming call signal, and (iii) creates a caller analytics record (CAR) representing the retrieved history records; and
   a statistical analyzer that receives the caller analytics record (CAR) and one or more other caller analytics records (CARs) and computes a sum and at least one of a mean, a variance, and a standard deviation of an analytical metric across one or more analytical facets for the received caller analytics record (CAR) and the one or more other caller analytics records (CARs),
   wherein the call analyzer comprises one or more knowledge-based heuristic rules that determine an inconsistency in originating line information (OLI) values across the history records associated with the metadata in the incoming call signal, and, based on the determined inconsistency in originating line information (OLI) values, determines a fraud risk score associated with an analytics metric, and
   wherein the fraud detection system outputs an overall fraud risk score associated with the call signal.

2. A fraud detection system for a telephony platform where call data records (CDRs) are generated for calls being serviced by the telephony platform, the fraud detection system comprising:
   a call analyzer that:

queries a history database for one or more history records associated with metadata in an incoming call signal from a caller device;
retrieves from the history database the history records associated with the metadata in the incoming call signal; and
creates a caller analytics record (CAR) representing the retrieved history records; and
a statistical analyzer that receives the caller analytics record (CAR) and computes a sum and at least one of a mean, a variance, and a standard deviation of at least one analytics metric across at least one analytical facet for the received caller analytics record,
wherein
the call analyzer comprises one or more knowledge-based heuristic rules that determine an inconsistency in originating line information (OLI) values across the history records associated with the metadata in the incoming call signal, and, based on the determined inconsistency in originating line information (OLI) values, determines a fraud risk score associated with an analytics metric, or
the statistical analyzer segments the caller analytics record (CAR) and one or more other caller analytics records (CARs) into different facets based on a facet ID included in each of the caller analytics record (CAR) and the one or more other caller analytics records (CARs), and
wherein the fraud detection system outputs an overall fraud risk score associated with the call signal.

3. The fraud detection system of claim 2, wherein the caller analytics record (CAR) includes the at least one analytics metric.

4. The fraud detection system of claim 2, wherein the at least one analytics metric comprises:
a total number of calls made by the caller device;
a total number of applications called in to by the caller device;
a total amount of time expended by the caller device on the telephony platform;
a total number of call legs involving the caller device;
a total number of unique days on which a call signal was received from the caller device;
a total number of time periods during that the caller device has not interacted with the telephony platform;
a total time period that the caller device has not interacted with the telephony platform; or
a total length of time covered by the history records associated with the metadata in the incoming call signal.

5. The fraud detection system of claim 4, wherein the total number of unique days on which a call signal was received from the caller device comprises:
1 or 2 calls;
3 to 5 calls;
6 to 10 calls;
11 to 20 calls; or
more than 20 calls.

6. The fraud detection system of claim 2, further comprising:
a watch list generator that receives the caller analytics record (CAR) and sorts the caller analytics record (CAR) based on the at least one analytics metric.

7. The fraud detection system of claim 2, wherein the statistical analyzer segments the caller analytics record (CAR) and the one or more other caller analytics records (CARs) into different facets based on the facet ID included in each of the caller analytics record (CAR) and the one or more other caller analytics records (CARs).

8. The fraud detection system of claim 7, wherein the statistical analyzer processes the caller analytics record (CAR) and the one or more other caller analytics records (CARs) in two distinct passes, including:
a first pass comprising computing a total value and an average value for the at least one analytics metrics; and
a second pass comprising computing a variance and a standard deviation for the at least one analytics metrics.

9. The fraud detection system of claim 2, wherein the statistical analyzer generates an analytics record that is stored in an analytics database.

10. The fraud detection system of claim 2, further comprising:
a data extractor that reads a plurality of call data records from a call data record database and generates a conversation record representing a unique interaction of the caller device with the telephony platform.

11. The fraud detection system of claim 10, further comprising:
a history record generator that transforms the conversation record into a history record,
wherein the history record is stored in the history database.

12. The fraud detection system of claim 7, wherein the facet ID identifies an all-inclusive facet, an IVR facet, or an IVR-group facet.

13. The fraud detection system of claim 2, wherein the at least one analytics metric is represented as a linguistic variable using fuzzy logic terms.

14. The fraud detection system of claim 13, wherein the fuzzy logic terms are represented as one or more fuzzy sets.

15. The fraud detection system of claim 2, wherein the call analyzer comprises one or more knowledge-based heuristic rules that determine the inconsistency in the originating line information (OLI) values across the history records associated with the metadata in the incoming call signal, and, based on the determined inconsistency in the originating line information (OLI) values, determines the fraud risk score associated with the analytics metric.

16. The fraud detection system of claim 15, wherein the determined inconsistency in originating line information (OLI) values is quantified and expressed as a linguistic variable.

17. The fraud detection system of claim 16, wherein the linguistic variable is modeled as a fuzzy set.

18. The fraud detection system of claim 2, wherein the call analyzer comprises one or more knowledge-based heuristic rules that determine Jurisdiction information Parameter (JIP) data from the metadata and determine an inconsistency in JIP values across the history records associated with the metadata in the incoming call signal, and, based on the determined inconsistency in JIP values, determines the fraud risk score associated with the at least one analytics metric.

19. A fraud detection system for a telephony platform where call data records (CDRs) are generated for calls being serviced by the telephony platform, the fraud detection system comprising:
a call analyzer that (i) queries a history database for one or more history records associated with metadata in an incoming call signal from a caller device, (ii) retrieves from the history database one or more history records associated with the metadata in the incoming call signal, and (iii) creates a caller analytics record (CAR) representing the retrieved one or more history records; and a statistical analyzer that receives the caller analytics record (CAR) and one or more other caller analytics records (CARs) and computes a sum and at least one of a mean, a variance, and a standard deviation of at least one analytics metric across an analytical facet for the received caller analytic record (CAR) and the one or more other caller analytics records, wherein the statistical analyzer segments the caller analytics record (CAR) and one or more other caller analytics records (CARs) into different facets based on a facet ID included in each of the caller analytics record (CAR) and the one or more other caller analytics records (CARs), and wherein the fraud detection system outputs an overall fraud risk score associated with the call signal.

20. The fraud detection system of claim 19, wherein:
the at least one analytics metric comprises
a total number of calls made by the caller device,
a total number of applications called in to by the caller device,
a total amount of time expended by the caller device on the telephony platform,
a total number of call legs involving the caller device,
a total number of unique days on which a call signal was received from the caller device,
a total number of time periods during that the caller device has not interacted with the telephony platform,
a total time period that the caller device has not interacted with the telephony platform, or
a total length of time covered by the history records associated with the metadata in the incoming call signal; and
the one more analytical facets comprise
an all-inclusive facet,
an IVR facet, or
an IVR-group facet.

* * * * *